United States Patent
Ferber et al.

(10) Patent No.: US 10,217,129 B2
(45) Date of Patent: Feb. 26, 2019

(54) AD PLACEMENT

(71) Applicant: Facebook, Inc., Menlo Park, CA (US)

(72) Inventors: John B. Ferber, Baltimore, MD (US);
Scott Ferber, Baltimore, MD (US);
Stein E. Kretsinger, Baltimore, MD (US); Robert Luenberger, Palo Alto, CA (US); David Luenberger, Stanford, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 13/705,056

(22) Filed: Dec. 4, 2012

(65) Prior Publication Data

US 2013/0097030 A1   Apr. 18, 2013

Related U.S. Application Data

(63) Continuation of application No. 13/693,000, filed on Dec. 3, 2012, which is a continuation of application No. 12/700,696, filed on Feb. 4, 2010, now Pat. No. 9,754,282, which is a continuation of application No. 09/610,197, filed on Jul. 1, 2000, now Pat. No. 7,822,636.

(Continued)

(51) Int. Cl.
*G06Q 30/02* (2012.01)

(52) U.S. Cl.
CPC ......... *G06Q 30/0246* (2013.01); *G06Q 30/02* (2013.01); *G06Q 30/0241* (2013.01); *G06Q 30/0244* (2013.01); *G06Q 30/0251* (2013.01); *G06Q 30/0254* (2013.01); *G06Q 30/0269* (2013.01); *G06Q 30/0277* (2013.01)

(58) Field of Classification Search
CPC ........................................ G06Q 30/02
USPC .......................................... 705/14
See application file for complete search history.

(56) References Cited

U.S. PATENT DOCUMENTS 5,636,346 A   6/1997 Saxe
5,724,521 A   3/1998 Dedrick
(Continued)

FOREIGN PATENT DOCUMENTS

JP   2000-163477   6/2000
WO   98-58334   12/1998

OTHER PUBLICATIONS

U.S. Appl. No. 13/620,899, filed Sep. 15, 2012, Ferber.
(Continued)

*Primary Examiner* — Patricia H Munson
(74) *Attorney, Agent, or Firm* — Keller Jolley Preece

(57) ABSTRACT

This invention concerns optimal ad selection for Web pages by selecting and updating an attribute set, obtaining and updating an ad-attribute profile, and optimally choosing the next ad. The present invention associates a set of attributes with each customer. The attributes reflect the customers' interests and they incorporate the characteristics that impact ad selection. Similarly, the present invention associates with each ad an ad-attribute profile in order to calculate a customer's estimated ad selection probability and measure the uncertainty in that estimate. An ad selection algorithm optimally selects which ad to show based on the click probability estimates and the uncertainties regarding these estimates.

36 Claims, 7 Drawing Sheets

Related U.S. Application Data

(60) Provisional application No. 60/164,253, filed on Nov. 8, 1999.

(56) References Cited

U.S. PATENT DOCUMENTS

| | | | |
|---|---|---|---|
| 5,848,396 | A | 12/1998 | Gerace |
| 5,918,014 | A | 6/1999 | Robinson |
| 5,930,762 | A | 7/1999 | Masch |
| 5,948,061 | A * | 9/1999 | Merriman et al. ............ 709/219 |
| 6,006,197 | A | 12/1999 | d'Eon et al. |
| 6,009,410 | A | 12/1999 | LeMole et al. |
| 6,012,051 | A | 1/2000 | Sammon et al. |
| 6,085,229 | A | 7/2000 | Newman et al. |
| 6,119,098 | A | 9/2000 | Guyot et al. |
| 6,144,944 | A | 11/2000 | Kurtzman, II et al. |
| 6,161,127 | A | 12/2000 | Cezar et al. |
| 6,216,129 | B1 | 4/2001 | Eldering |
| 6,236,975 | B1 | 5/2001 | Boe et al. |
| 6,285,985 | B1 | 9/2001 | Horstmann |
| 6,285,987 | B1 | 9/2001 | Roth et al. |
| 6,314,451 | B1 | 11/2001 | Landsman et al. |
| 6,317,761 | B1 | 11/2001 | Landsman et al. |
| 6,317,782 | B1 | 11/2001 | himmel et al. |
| 6,327,574 | B1 | 12/2001 | Kramer et al. |
| 6,353,849 | B1 | 3/2002 | Linsk |
| 6,370,578 | B2 | 4/2002 | Revashetti et al. |
| 6,442,529 | B1 | 8/2002 | Krishan et al. |
| 6,453,347 | B1 | 9/2002 | Revashetti et al. |
| 6,470,079 | B1 | 10/2002 | Benson |
| 6,477,509 | B1 | 11/2002 | Hammons et al. |
| 6,477,575 | B1 | 11/2002 | Koeppel et al. |
| 6,487,538 | B1 | 11/2002 | Gupta |
| 6,560,578 | B2 | 5/2003 | Eldering |
| 6,567,786 | B1 * | 5/2003 | Bibelnieks et al. ....... 705/14.44 |
| 6,591,248 | B1 | 7/2003 | Nakamura et al. |
| 6,601,041 | B1 * | 7/2003 | Brown et al. ............. 705/14.61 |
| 6,647,257 | B2 | 11/2003 | Owensby |
| 6,850,252 | B1 | 2/2005 | Hoffberg |
| 6,907,566 | B1 * | 6/2005 | McElfresh et al. ............ 715/210 |
| 6,925,441 | B1 * | 8/2005 | Jones et al. .................. 705/7.33 |
| 6,963,850 | B1 | 11/2005 | Bezos et al. |
| 7,010,497 | B1 | 3/2006 | Nyhan et al. |
| 7,039,599 | B2 | 5/2006 | Merriman et al. |
| 7,150,030 | B1 | 12/2006 | Eldering |
| 7,822,636 | B1 | 10/2010 | Ferber |
| 2001/0014868 | A1 | 8/2001 | Herz et al. |
| 2002/0072965 | A1 | 6/2002 | Merriman et al. |
| 2002/0099600 | A1 * | 7/2002 | Merriman et al. .............. 705/14 |
| 2003/0083931 | A1 | 5/2003 | Lang |
| 2007/0027744 | A1 | 2/2007 | Carson et al. |
| 2010/0257053 | A1 | 10/2010 | Ferber |
| 2013/0097026 | A1 | 4/2013 | Ferber et al. |

OTHER PUBLICATIONS

U.S. Appl. No. 13/620,902, filed Sep. 15, 2012, Ferber.
U.S. Appl. No. 13/620,907, filed Sep. 15, 2012, Ferber.
U.S. Appl. No. 13/612,621, filed Sep. 12, 2012, Ferber.
U.S. Appl. No. 13/612,625, filed Sep. 12, 2012, Ferber.
U.S. Appl. No. 13/612,631, filed Sep. 12, 2012, Ferber.
U.S. Appl. No. 13/705,028, filed Dec. 4, 2012, Ferber.
U.S. Appl. No. 13/705,059, filed Dec. 4, 2012, Ferber.
U.S. Appl. No. 13/705,066, filed Dec. 4, 2012, Ferber.
Final Office Action in U.S. Appl No. 12/700,696 dated Jun. 20, 2012, 20 pages.
Non Final Office Action in U.S. Appl No. 12/700,696 dated Dec. 7, 2011, 27 pages.
U.S. Appl. No. 13/612,625, Nov. 7, 2013, Office Action.
U.S. Appl. No. 13/612,631, Aug. 22, 2013, Office Action.
U.S. Appl. No. 13/620,899, Oct. 24, 2013, Office Action.
U.S. Appl. No. 13/620,902, Oct. 15, 2013, Office Action.
U.S. Appl. No. 13/620,907, Oct. 24, 2013, Office Action.
U.S. Appl. No. 13/693,000, Oct. 24, 2013, Office Action.
U.S. Appl. No. 09/610,197, Jun. 23, 2003, Office Action.
U.S. Appl. No. 09/610,197, Mar. 1, 2004, Office Action.
U.S. Appl. No. 09/610,197, Nov. 4, 2004, Office Action.
U.S. Appl. No. 09/610,197, Mar. 31, 2005, Office Action.
U.S. Appl. No. 09/610,197, Oct. 24, 2005, Office Action.
U.S. Appl. No. 09/610,197, Jul. 27, 2006, Office Action.
U.S. Appl. No. 09/610,197, Mar. 16, 2017, Office Action.
U.S. Appl. No. 09/610,197, Nov. 27, 2007, Office Action.
U.S. Appl. No. 09/610,197, Jul. 28, 2008, Office Action.
U.S. Appl. No. 09/610,197, Apr. 6, 2009, Office Action.
U.S. Appl. No. 09/610,197, Jun. 24, 2010, Notice of Allowance.
U.S. Appl. No. 12/700,696, Jun. 21, 2013, Office Action.
U.S. Appl. No. 13/612,621, Mar. 22, 2013, Office Action.
U.S. Appl. No. 13/612,625, Mar. 15, 2013, Office Action.
U.S. Appl. No. 13/620,899, Feb. 14, 2013, Office Action.
U.S. Appl. No. 13/620,902, Feb. 5, 2013, Office Action.
U.S. Appl. No. 13/620,907, Jan. 31, 2013, Office Action.
U.S. Appl. No. 13/693,000, Feb. 15, 2013, Office Action.
U.S. Appl. No. 13/705,028, Feb. 25, 2013, Office Action.
U.S. Appl. No. 13/705,059, Jun. 21, 2013, Office Action.
U.S. Appl. No. 13/705,066, May 10, 2013, Office Action.
U.S. Appl. No. 13/705,028, Sep. 25, 2014, Office Action.
U.S. Appl. No. 13/620,907, Oct. 31, 2014, Office Action.
U.S. Appl. No. 13/612,621, Mar. 31, 2014, Office Action.
U.S. Appl. No. 13/612,631, Feb. 27, 2014, Office Action.
U.S. Appl. No. 13/620,899, Mar. 20, 2014, Office Action.
U.S. Appl. No. 13/620,907, Apr. 14, 2014, Office Action.
U.S. Appl. No. 13/705,028, Mar. 21, 2014, Office Action.
U.S. Appl. No. 13/705,066, Mar. 13, 2014, Office Action.
U.S. Appl. No. 12/700,696, Jan. 31, 2014, Office Action.
U.S. Appl. No. 13/612,621, Dec. 2, 2013, Office Action.
U.S. Appl. No. 13/705,028, Nov. 15, 2013, Office Action.
U.S. Appl. No. 13/705,059, Feb. 10, 2014, Office Action.
U.S. Appl. No. 13/620,899, Aug. 28, 2014, Office Action.
U.S. Appl. No. 13/620,907, Aug. 20, 2015, Office Action.
U.S. Appl. No. 13/705,066, Jul. 1, 2015, Office Action.
U.S. Appl. No. 13/612,625, Mar. 17, 2015, Office Action.
U.S. Appl. No. 13/620,899, Mar. 12, 2015, Office Action.
Pollard, David, "Chapter 8: Poisson approximations", Oct. 19, 1997, http://www.statyale.edui-pollard/Courses/241.fal197/Poisson. pdf pp. 1-2.
U.S. Appl. No. 13/612,631, Dec. 8, 2016, Office Action.
U.S. Appl. No. 13/620,899, Dec. 12, 2016, Office Action.
U.S. Appl. No. 13/620,907, Dec. 8, 2016, Office Action.
The Binomial Distribution, Sep. 16, 1997, Yale University, http://www.stat.yale.edu/Courses/1997-98/101/binom.htm p. 3 of 4 retrieved on May 2, 2017.
U.S. Appl. No. 12/700,696, Apr. 20, 2017, Notice of Allowance.
U.S. Appl. No. 13/620,907, May 22, 2017, Office Action.
Mayfield, Philip "Understanding Binomial Confidence Intervals", Apr. 15, 1999, SigmaZone.com p. 1-5.
U.S. Appl. No. 13/612,631, Dec. 14, 2015, Office Action.
U.S. Appl. No. 13/620,899, Dec. 17, 2015, Office Action.
U.S. Appl. No. 13/620,907, Mar. 1, 2016, Office Action.
U.S. Appl. No. 13/705,066, Dec. 1, 2015, Office Action.
U.S. Appl. No. 13/620,899, Sep. 13, 2017, Office Action.
Kot, A.C. Bias and variance calculation of a principal component based frequency estimator. Aug. 1995, IEE Proc-Vis. Image Signal Process., vol. 142, No. 4, Aug. 1995 (Year: 1995).
U.S. Appl. No. 13/612,625, filed Sep. 20, 2018, Notice of Allowance.
U.S. Appl. No. 13/612,631, filed Oct. 9, 2018, Notice of Allowance.
U.S. Appl. No. 13/620,899, filed Oct. 24, 2018, Notice of Allowance.

* cited by examiner

AD PLACEMENT

CROSS-REFERENCE TO RELATED APPLICATIONS

This application is a continuation of U.S. application Ser. No. 13/693,000 filed on Dec. 3, 2012, which is a continuation of U.S. application Ser. No. 12/700,696 filed on Feb. 4, 2010, which is a continuation of U.S. application Ser. No. 09/610,197 filed on Jul. 1, 2000 and now issued as U.S. Pat. No. 7,822,636, which claims the benefit of U.S. Provisional Application No. 60/164,253, titled "Optimal Internet Ad Placement Technology," filed Nov. 8, 1999. The entire contents of each of the foregoing applications and patent are incorporated by reference herein.

BACKGROUND OF THE INVENTION

This invention relates generally to the allocation (e.g. as in a market or exchange) of the supply of a class of products/services with the demand for a class of products/services in an optimal manner (i.e. system-wide best solution since the values of different allocation strategies may vary significantly) that quantifies and accounts for the uncertainty surrounding the supply and demand of different products/services. More particularly, the present invention comprises a system and method for the optimal placement of ads on Web pages.

Optimal ad placement has become a critical competitive advantage in the Internet advertising business. Consumers are spending an ever-increasing amount of time online looking for information. The information, provided by Internet content providers, is viewed on a page-by-page basis. Each page can contain written and graphical information as well as one or more ads. Key advantages of the Internet, relative to other information media, are that each page can be customized to fit a customer profile and ads can contain links to other Internet pages. Thus, ads can be directly targeted at different customer segments and the ads themselves are direct connections to well-designed Internet pages. Although the present example has been described with respect to traditional Web browsing on a Web page, the same principals apply for any content, including information or messages, as well as advertisements, delivered over any Internet enabled distribution channel, such as via e-mail, wireless devices (including, but not limited to phones, pagers, PDAs, desktop displays, and digital billboards), or other media, such as ATM terminals.

Therefore, as used herein, the term "ad" is also meant to include any content, including information or messages, as well as advertisements, such as, but not limited to, Web banners, product offerings, special non-commercial or commercial messages, or any other sort of displayed or audio information.

The terms "Web page," "Web site," and "site" are meant to include any sort of information display or presentation over an Internet enabled distribution channel that may have customizable areas (including the entire area) and may be visual, audio, or both. They may be segmented and or customized by factors such as time and location. The term "Internet browser" is any means that decodes and displays the above-defined Web pages or sites, whether by software, hardware, or utility, including diverse means not typically considered as a browser, such as games.

The term "Internet" is meant to include all TCP/IP based communication channels, without limitation to any particular communication protocol or channel, including, but not limited to, e-mail, News via NNTP, and the WWW via HTTP and WAP (using, e.g., HTML, DHTML, XHTML, XML, SGML, VRML, ASP, CGI, CSS, SSI, Flash, Java, JaysScript, Perl, Python, Rexx, SMIL, Tcl, VBScript, HDML, WML, WMLScript, etc.).

The term "customer" or "user" refers to any consumer, viewer, or visitor of the above-defined Web pages or sites and can also refer to the aggregation of individual customers into certain groupings. "Clicks" and "click-thru-rate" or "CTR" refers to any sort of definable, trackable, and/or measurable action or response that can occur via the Internet and can include any desired action or reasonable measure of performance activity by the customer, including, but not limited to, mouse clicks, impressions delivered, sales generated, and conversions from visitors to buyers. Additionally, references to customers "viewing" ads is meant to include any presentation, whether visual, aural, or a combination thereof.

The term "revenue" refers to any meaningful measure of value, including, but not limited to, revenue, profits, expenses, customer lifetime value, and net present value (NPV).

The Internet ad placement technology of the present invention provides an optimal strategic framework for selecting which ad a customer will view next. It maximizes the overall expected ad placement revenue (or any other measure of value), trading off the desire for learning with revenue generation. The technology can be executed in "real-time" and updates the strategy space for every customer.

At its core, the problem is to place the right ad to the right customer. Ad placements are compensated based on the number of successful responses that they generate. This usually means that compensation occurs every time a customer responds to (e.g., clicks) an ad. Customers respond to ads according to their interests and demands. Thus, a key necessity is to obtain a reliable characteristic profile of each customer. Only with given information about the customer can ads be provided that are targeted towards each customer. Second, there is a need to estimate how different customers will react to different ads. That is, a customer-ad response relation is required. Finally, there is a need for an ad placement technology that optimally decides which ad to show. At the instant a customer opens a page, it is necessary to place an ad. The ad placement technology must incorporate the customer's likely response to each ad and the financial gains resulting from a customer's selection of an ad.

A successful ad placement technology must overcome several critical complications. First, the ad placement algorithm must be sufficiently fast to ensure "real-time" placement. Second, a key element of the technology is its ability to learn through continuous updating. Little information is available about new ads. However, as ads are placed, it can be learned how they relate to various customer profiles. Thus, the technology should both be able to learn and trade off learning versus revenue generation. Finally, the ad placement technology must be able to detect ineffective ads and incorporate minimum and maximum ad placement and ad selection constraints.

BRIEF SUMMARY OF THE INVENTION

This invention concerns optimal ad selection for Internet-delivered ads, such as for Web pages, by selecting and updating an attribute set, obtaining and updating an ad-attribute profile, and optimally choosing the next ad. The present invention associates a set of attributes with each customer. The attributes reflect the customers' interests and they incorporate the characteristics that impact ad selection. Similarly, the present invention associates with each ad an ad-attribute profile in order to calculate a customer's estimated ad selection probability and measure the uncertainty in that estimate. An ad selection algorithm optimally selects which ad to show based on the click probability estimates and the uncertainties regarding these estimates.

It is therefore an object of the present invention to integrate the optimization and scheduling of web-based ad serving.

It is another object of the present invention to provide an optimal strategic framework for selecting which ad a customer will view next.

It is also an object of the present invention to maximize the overall expected ad placement revenue (or any other measure of value), trading off the desire for learning with revenue generation.

It is another object of the present invention to place ads on Web sites in such a way as to maximize the overall value for the ad serving entity, whether based on impressions, clicks, conversions, or combinations thereof.

It is an object of the present invention to provide an ad placement algorithm that is sufficiently fast to ensure "real-time" ad placement.

It is an object of the present invention to provide an ad placement technology that has the ability to learn through continuous updating.

It is another object of the present invention to provide an ad placement technology that is able to detect ineffective ads and incorporate minimum and maximum ad placement and ad selection constraints.

It is an object of the present invention to provide an estimate of the probability a customer will click an ad by estimating a principal component vector as well as the ad's click probabilities.

It is yet another object of the present invention to provide binomial updating of click probabilities using principal components, as well as category restrictions and ad blocking.

It is yet another object of the present invention to provide automatic clustering of Web pages in a manner that effectively improves overall Click-Thru-Rates.

It is another object of the present invention to provide optimal delivery of content, messages, and/or ads to customers by any Internet enabled distribution channel.

It is a final object of the present invention to optimize ad placement across a diverse set of media, such as banners, e-mail, and wireless, in an integrated manner via an allocator.

These and other objectives of the present invention will become apparent from a review of the detailed description that follows.

DETAILED DESCRIPTION OF THE INVENTION

Figure 1:
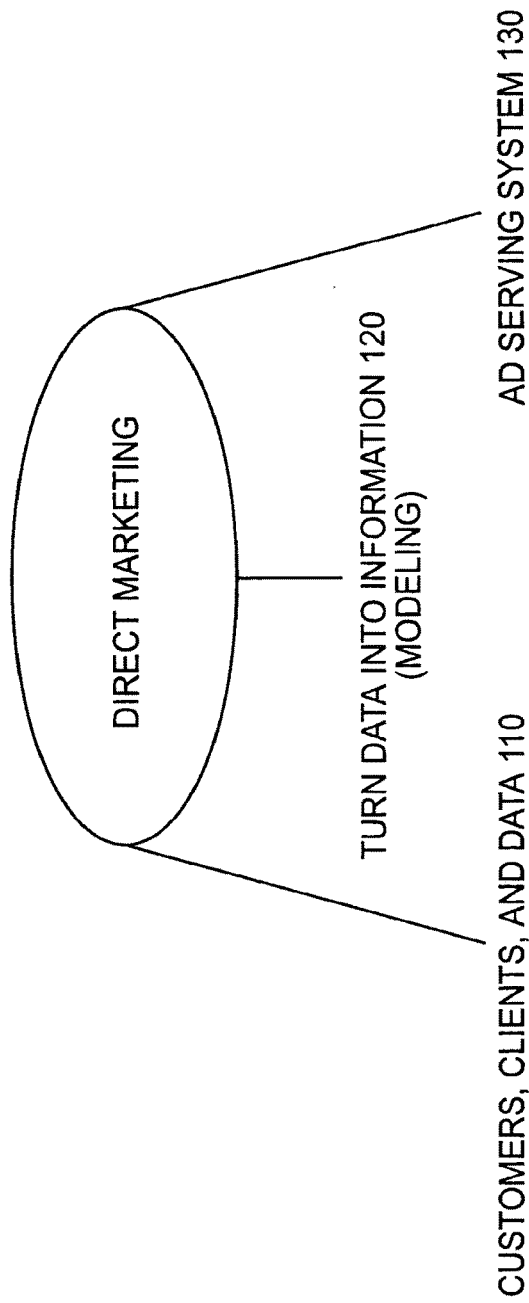
FIG. 1 illustrates the possible use of the present invention in a prior art direct marketing system.
Figure 8:
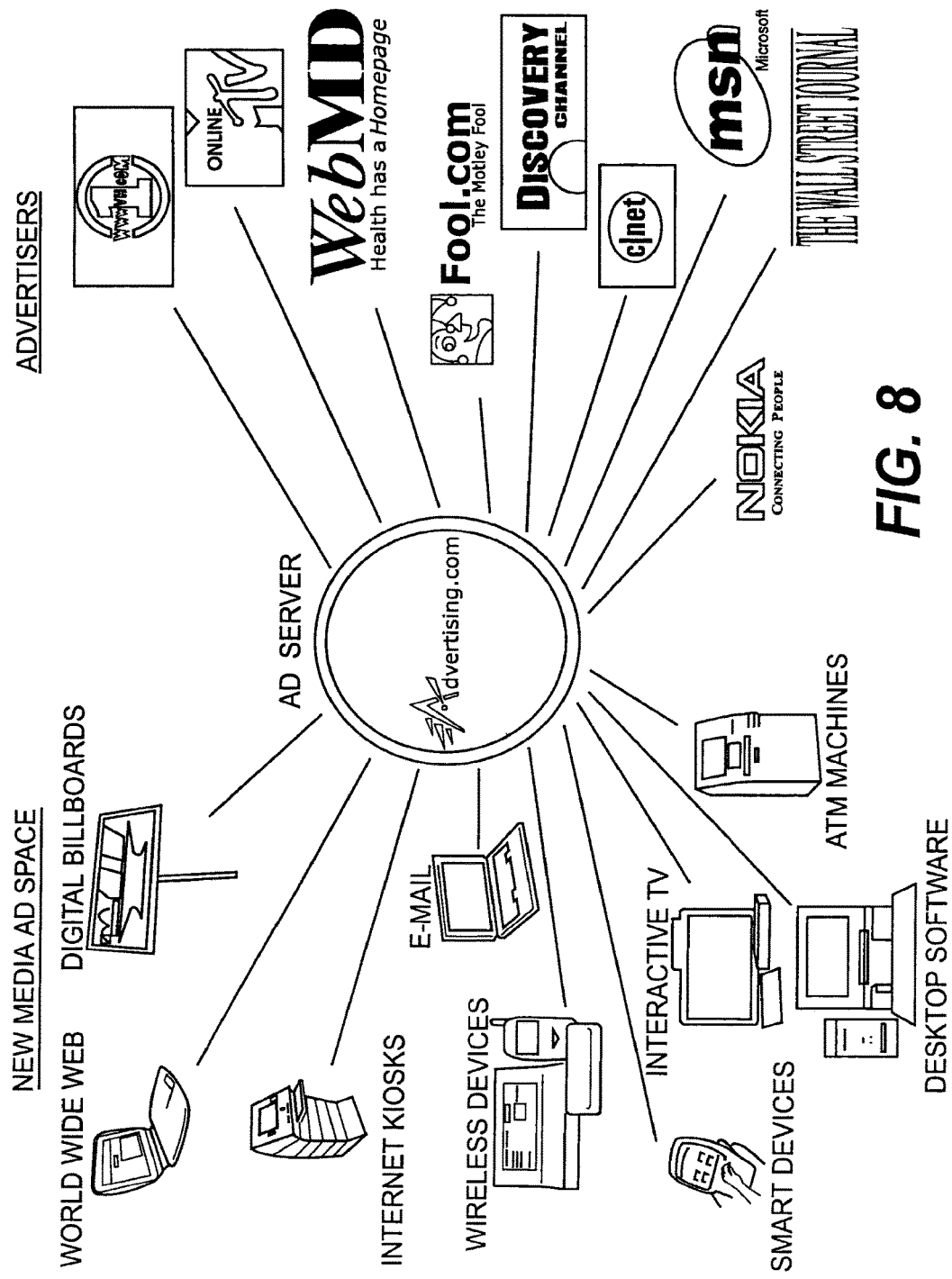
FIG. 8 illustrates a matching of supply and demand for advertising on Internet enabled distribution channels.

The present invention comprises a system and method of optimal ad placement. This invention divides the optimal ad selection problem into three parts: (1) how to select and update the attribute set, (2) how to obtain and update the ad-attribute profile, and (3) how to optimally choose the next ad. For purposes of this description, the application of the present invention will be illustrated with respect to reconciling the supply of Web pages with the demand for ads on those Web pages in an optimal manner that maximizes revenue. It is assumed that each Web page can only promote one ad at a time, although that is not a limitation of the present invention. Furthermore, the ad provider pays on a per click (ad selection) basis. A typical employment of the invention is illustrated in FIG. 1, wherein customer and client (ad) data 110 is input, turned into information 120 for modeling and used for ad serving 130, as illustrated in FIG. 8.

The present invention associates a set of attributes with each customer. The attributes reflect the customers' interests and they incorporate the characteristics that impact ad selection.

Similarly, the present invention associates with each ad an ad-attribute profile. The ad-attribute profile has two uses, to calculate a customer's estimated ad selection probability, and to measure the uncertainty in that estimate.

The ad selection algorithm optimally selects which ad to show based on the click probability estimates and the uncertainties regarding these estimates. That is, it optimally trades off current revenue potential with future revenue potential represented by the uncertainty surrounding these estimates. Ads that have been frequently placed will have a well-documented current revenue potential while new ads with few placements represent the possibility of high future potential.

As customers have long-term interests as well as short-term demands the present invention divides attributes into a long-term and a short-term attribute sets. The long-term attribute set measures how much time customers spend in different interest categories such as business, sports, and health. The short-term attributes detect when a customer is searching for specific products.

Long-Term Attributes

Long-term customer attributes in the present invention are updated, depending on time and network constraints, on a placement-by-placement or on a time period-by-time period (for example day-by-day) basis. The attributes measure, for example, how much time on a percentage basis a customer spends in each interest group (i.e., sports, gardening, etc.). Thus, suppose that the customer chooses sports half the time and finance half the time. Then sports and finance attributes are each 50% and the remaining attributes are 0%.

Customer interests also change. To accommodate this factor the present invention implements either a moving average or an exponentially-weighted approach to updating each customer's long term attributes. Both of these statistical methods put more emphasis on recent information and can be updated easily.

The attributes together cover all the distinctive characteristics of the customers. There are two ways the attributes are structured. The present invention has a common set of attributes that are always updated. Alternatively, the present invention has two sets of attributes, a base set given by easily available data, and a second set of attributes that are revealed as the customer carries out certain actions.

Short-Term Attributes

The short-term attribute set of the present invention signals every time there is a specific interest for a particular service or product. For example, suppose a customer is currently shopping for a computer. Such an event can be detected by specifically marking sites that perform computer comparison tests. The probability that the customer selects a computer ad will be high.

Ad-Attribute Profiles

Customers also respond differently to different ads. The ad-attribute profile of the present invention measures how sensitive the ad is to the various attributes and thus how likely it is that a customer will react when shown an ad. As the profile for a given customer is not known ahead of time, it must be estimated. This profile estimation algorithm provides an efficient means for updating the attribute estimates in "real time." It is not necessary to store the complete history of customers' responses, but only a set of sufficient statistics for each ad. The sufficient statistics are one square matrix variable with dimension equal to the number of attributes, one vector variable with dimension equal to the number of attributes, and two scalars. Furthermore, the sufficient statistics can be quickly calculated.

The profile estimation algorithm also records the uncertainty of each ad-attribute. The uncertainty conceals an ad's effectiveness (as measured by the true click probability). As an ad's effectiveness directly drives the revenue generation it is important to quickly derive a good estimate. The uncertainty regarding an ad's effectiveness decreases as the number of times it is shown increases.

Optimal Selection

The ad selector of the present invention places ads in a way that maximizes the expected overall long-term ad placement revenue (or any other measure of value). The ad placement revenue is the compensation received every time an ad is clicked. For the moment, suppose that it is known with certainty the ad-attribute profile for each ad. This means that the probabilities that the customer will react to the ads can be calculated. Multiplying the probabilities with the compensations of the corresponding ads yield the expected ad placement revenues for all ads. The choice that maximizes the expected overall ad placement revenue is then simply the ad with the highest expected ad placement revenue (or any other measure of value).

Unfortunately, one does not know with certainty the ad attribute profiles. This means that the above selection algorithm, if employed using the estimated ad-attribute profile, would not correctly account for revenue generation opportunities of those ads that have not been shown, because it would not incorporate the huge estimation uncertainty of those ads.

This ad-placement algorithm incorporates the uncertainty as well as the expected ad revenue in the selection criterion. Conceptually, the uncertainty is a reflection of the ad's potential upside. That is, it is more likely that the probability of an ad with high uncertainty is significantly higher than its' estimated value than an ad with low uncertainty. Only by testing can the present invention determine whether it is actually true. If true it is clear that there is much to gain in the future.

The ad-placement selection rule works by for each ad combining the volatility and the expected value of the ad placement revenue in a certain way. This rule is based on a dynamic programming approach. This approach yields the true optimal selection algorithm among all possible non-anticipating selection algorithms. The present invention adapts the dynamic programming solution to obtain a strategy that can be updated in real-time.

Figure 7:
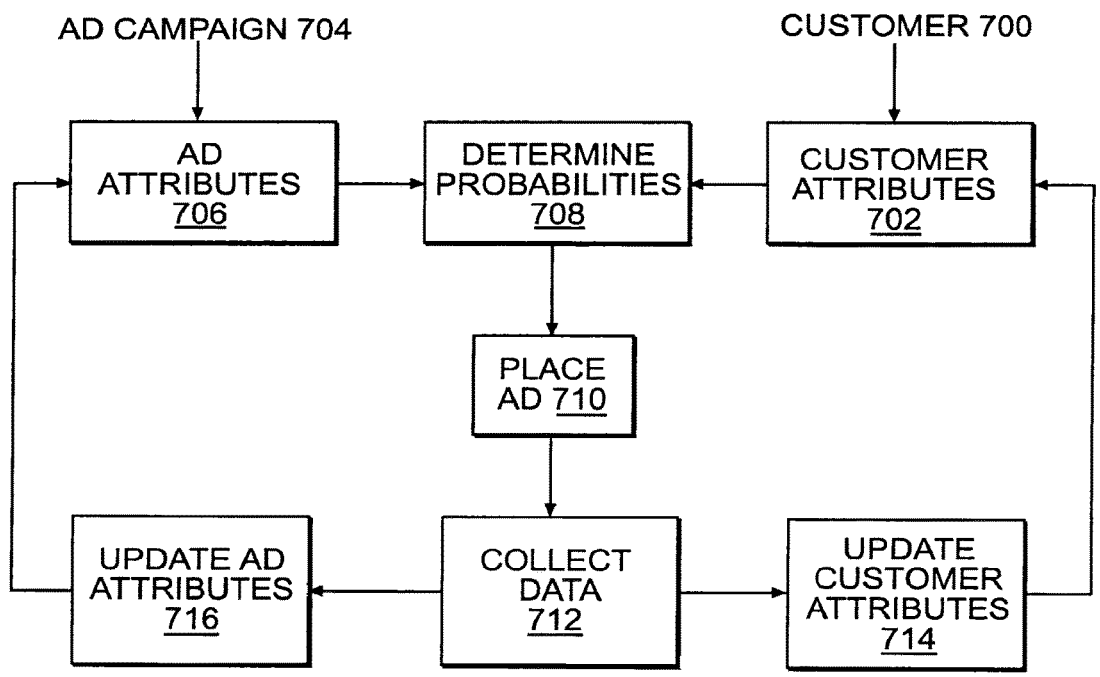
FIG. 7 illustrates a schematic of the process of the present invention.

The basic modeling technique of the present invention is outlined below and illustrated in FIG. 7.

Basic Modeling

There are L customers 700 for each of whom the present invention tracks the value of MA customer attributes 702. Customer attributes 702 may be time-based, geography based, or any other segmentable and tractable attribute. There are N different ads in campaign 704.

The present invention maintains a customer matrix:

| Customer ID | Attribute 1 | Attribute 2 | ... | Attribute MA |
|---|---|---|---|---|
| ID_1 | A_11 | A_12 | ... | A_1MA |
| ID_2 | A_21 | A_22 | ... | A_2MA |
| ID_L | A_L1 | A_L2 | ... | A_LMA |

And an ad matrix:

| Ad ID | Attribute 1 weight | ... | Attribute MA weight |
|---|---|---|---|
| Ad_1 | W_11 | ... | W_1MA |
| Ad_2 | W_21 | ... | W_2MA |
| Ad_N | W_N1 | ... | W_NMA |

Approach 1

1. The estimated probability of customer x clicking on ad i is given by $$\sum_{k=1}^{MA} (A\_xk)(W\_ik).$$

2. Every time a customer visits a Web site within the network, the data is collected 712 and the attributes of that customer are updated 714.
3. Every time a customer is shown an ad, the attribute weightings for that ad are updated 716 depending on how the customer responded.

The calculation of which ad to show 710 is then clearly quick to compute as it is essentially (MA)(N) multiplications and additions and then a comparison of the determined probabilities 708. With some careful thought, the updates of the customer and ad matrices can also be done rapidly and with numerical stability.

As the present invention collects more data, this method continues to refine the estimates and thus is referred to as Bayesian. Ads may lose their effectiveness over time, and people's attributes will certainly evolve over time. To capture this there are several updating methods that weight recent data more heavily. All of these methods can be updated quickly and require little storage.

Figure 2:
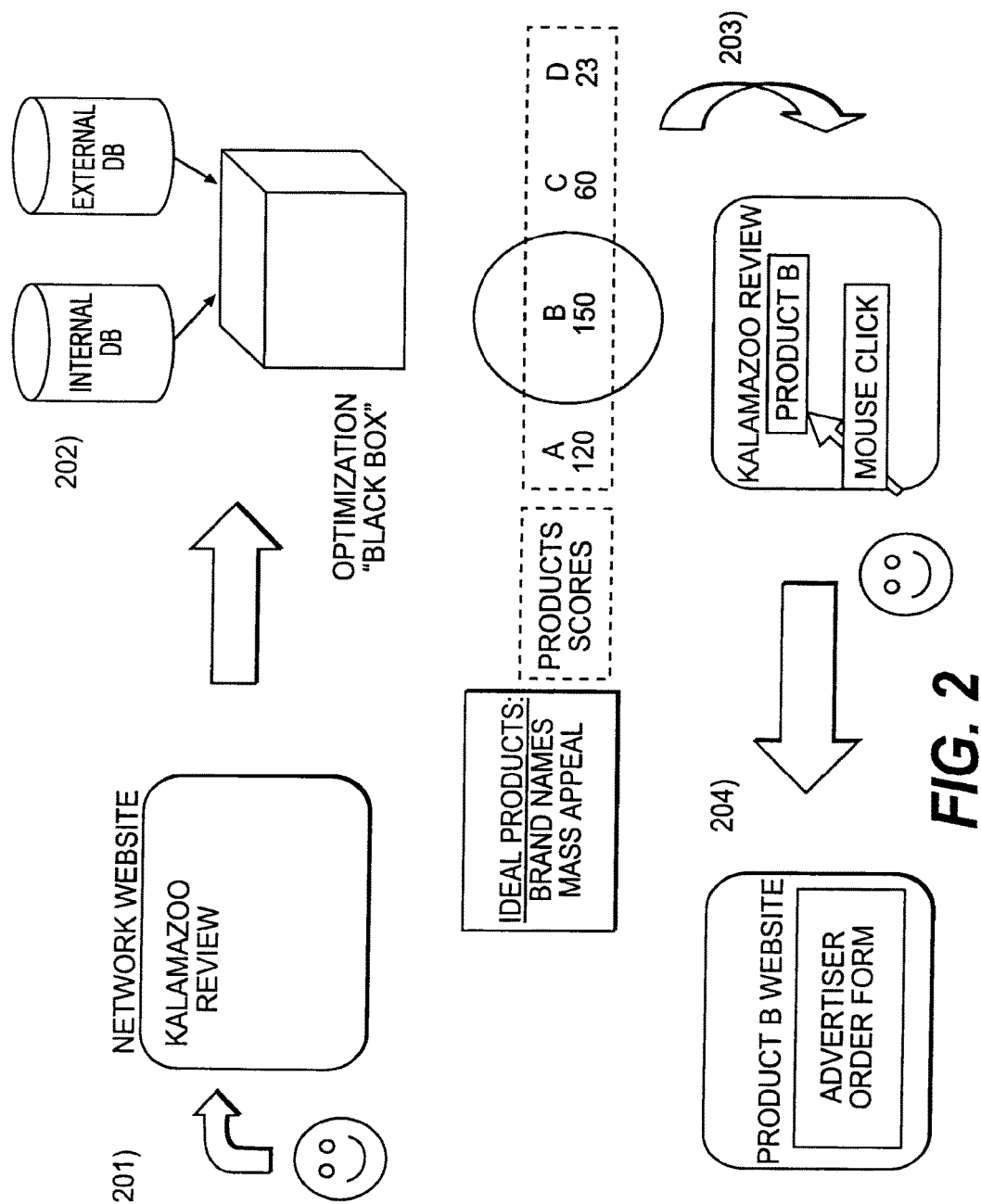
FIG. 2 illustrates a first embodiment of the present invention for brand name and mass appeal products.
Figure 3:
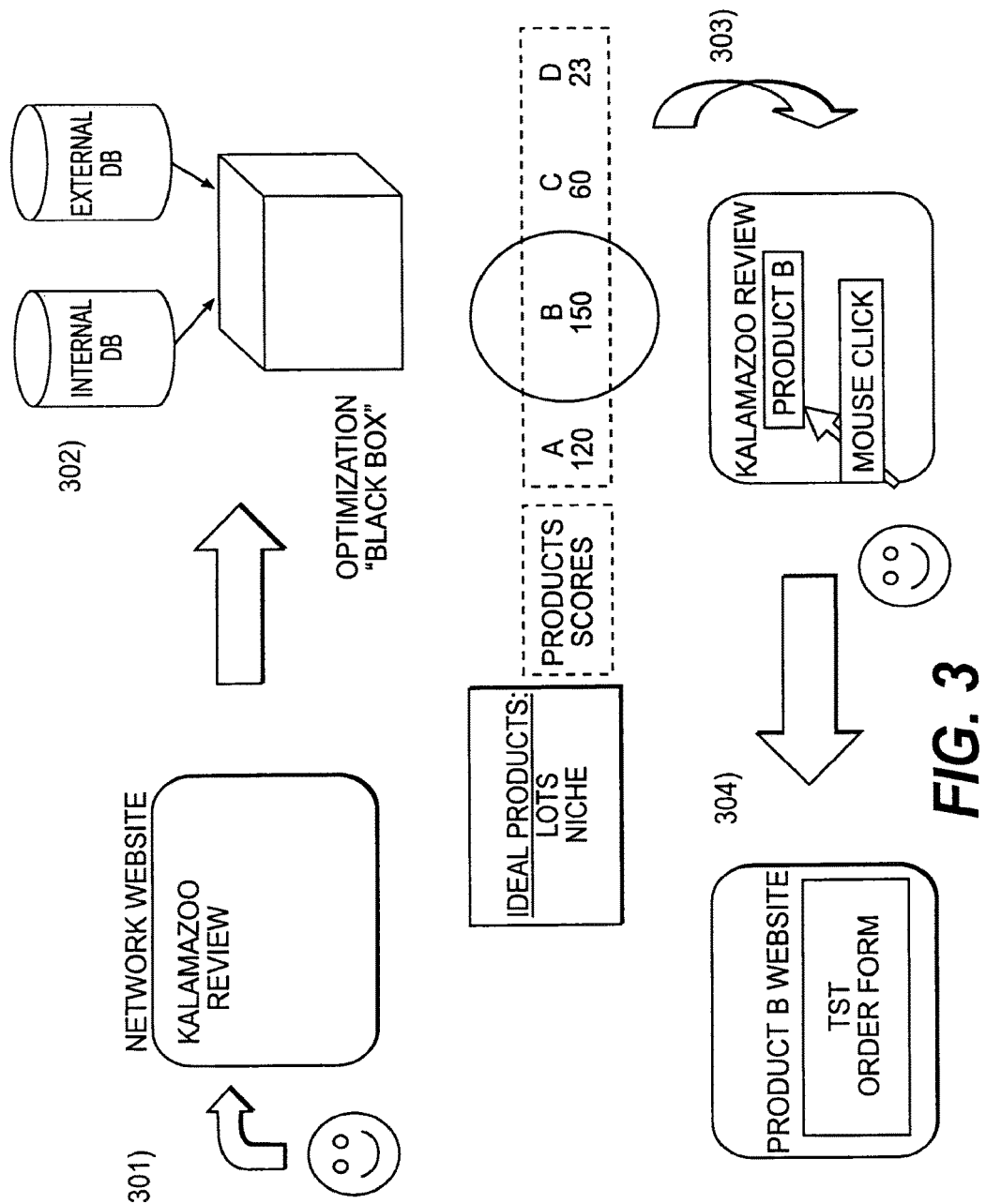
FIG. 3 illustrates a second embodiment of the present invention for lots and niche products.

In use, as shown in FIGS. 2 and 3, a customer accesses a participating Web site at illustrated 201, 301, an ad server determines the best ad to place (highest score of 150) at 202, 302, the ad is served to the Web site at 203, 303 and a click by the customer directs him to the advertisers Web site at 204, 304.

Adding Uncertainty and Optimizing for Earning Vs. Learning

Intuitively, there is a big difference between an ad that has been shown 100 times and been selected once and an ad that has been shown 10,000 times and been selected 100 times, even though each has been selected 1% of the times it has been shown. It is somehow worth something to us to learn more about the first ad, as it is quite possible that it will turn out to be a very popular ad.

The present invention alters the above structure by carrying not just the mean but the standard deviation of each estimated random variable as well.

The ad selection process then works by combining the estimated probability and the standard deviation in a certain way for each ad and then comparing. When done properly, this is the optimal way to balance earning and learning.

Updates of the standard deviation can be calculated quickly as they can be based on the updates of the estimated probabilities.

Adding Structure to the Matrices

The present invention is also able to learn more about a given customer from other customers than the above is yet capturing. As a simple example, imagine that one has discovered that a particular ad is very popular with males and this system is considering showing it to a particular customer. The present invention has an attribute for gender, but doesn't yet know if this particular customer is male or female. However, there is lots of other data about the customer, such as interest level in sports. By looking at the attributes of all other customers, and the associated correlations, the present invention can estimate the probability that this customer is male. The present invention may find, for instance, that interest in sports is highly indicative of being male.

Choosing the Attributes

A key aspect of the present invention is identifying attributes that are predictive of behavior. This step requires analyzing real data, and should be re-visited periodically. Second, for numerical stability, the present invention must choose attributes that are not too similar to one another. There are several ways to choose a representative attribute set, basically by selecting orthogonal attributes. Third, the present invention needs concrete policies for deleting non-helpful attributes and splitting ones that are particularly useful. Finally, there are several statistical/data-analysis methods the present invention can employ to create updating procedures for the values of each attribute. The right procedure will depend on initial statistical tests and is also a step that should be re-visited at a later stage.

As customers have long-term interests as well as short-term demands the present invention divides attributes into a long-term and a short-term attribute sets. The long-term attribute set measures how much time customers spend in different interest categories such as business, sports, and health. Thus, suppose that the customer chooses sports half the time and finance half the time. Then sports and finance attributes are each 50% and the remaining attributes are 0%.

The short-term attributes detect when a customer is searching for specific products. For example, a customer shopping for a new computer will likely visit sites that relate to computer sales. Such sites can be marked and computer ads placed on such sites have high probabilities of being selected, while general interest ads have markedly lower probability of being selected.

Searching among the short-term attributes, for ads to show, will be quick as they only flag high probability events.

Advanced Modeling with Integrated Optimization and Scheduling

Every Web site used with the present invention sends a request for an ad every time a user accesses the site. The request is sent to the ad manager. The ad manager has a lookup table specifying ads and associated probabilities defining the ads that should be shown next for every site. This lookup table is updated frequently, such as every hour or on any other relevant time unit basis.

The system records that the ad has been shown and whether or not there was a click. The system holds a database with the number of impressions and clicks for each ad on each site by hour. The system also maintains a list of the total and remaining paid clicks for each ad, and a list of payments per click for each ad.

Basics

The goal of the optimizer-scheduler is to place ads on Web sites in such a way as to maximize the overall value for the advertising serving entity. This value may be a combination of impression, clicks, conversions, and other value that may be obtained by placing an ad on a particular site. The probability of a given ad being clicked on varies from site to site. The present invention does not know these probabilities beforehand but, rather, the present invention continuously refines this estimate as more observations are made. There is value in obtaining additional information about these probabilities and this is accounted for in the algorithm.

Arrangements with Web sites tend to be fairly long-term. Arrangements with advertisers tend to be composed of campaigns, each lasting from days to weeks. The advertisers typically purchase a certain number of clicks. While not always spelled out explicitly, the understanding is that these clicks will occur reasonably uniformly over the campaign's lifetime. Of course, there is no way to guarantee that an ad does not fall behind schedule (it is possible that nobody chooses to click on the ad). The present invention can, however, ensure (assuming that there is a reasonably rich set of ads) that no ad gets significantly ahead of schedule. This is captured via a tunable parameter within the algorithm.

Occasionally, the arrangement with the advertiser is simply to show the ad a specified number of times. The system of the present invention serves the requested ad according to attributes described above while simultaneously tracking the number of times the ad is displayed.

While taking the full lifetime of each campaign into account, the algorithm explicitly plans for the next 24 hours or other such reasonable period, and then re-optimizes more frequently, such as every hour.

Definitions

System Variables m denotes the number of Web sites or any reasonable partition of the Web sites in the network.

n denotes the number of ad campaigns or any reasonable collection of ads currently underway.

K denotes the set of ads that are on a pay-per-click basis or any other similar measure of performance.

M denotes the set of ads that are on a pay-per-view basis or any other reasonable measure of activity that is not performance related.

$d_j$ denotes the estimated number of impressions for a first period, such as one 24-hour period or other reasonable period, at site j.

$\mu_j$ denotes the average clicking probability at site j calculated over a second, longer period, such as the past 30 days or other such reasonable period. Only incorporating the observed probabilities for ads that have at least, for example, 500 impressions at that site, then one possible embodiment would be to set $\mu_j$=0.005 if site j is new. Else $$\mu_j = \max\left(\underset{i:n_{i,j}>500}{Average}(p_{i,j}), 0.001\right)$$

In this example, the use of 30 days, 500 impressions, and the tolerances of 0.005 and 0.001 are merely exemplary and are not meant as a limitation on the average clicking probability $\mu_j$. Other timelines and constants could also be used without departing from the scope of the invention.

Campaign Variables $T_i$ denotes the total duration in days of ad campaign i.

$t_i$ denotes the time in days since the ad campaign of ad i began.

$C_i$ denotes the maximum total number of paid clicks for ad i over the duration of the ad campaign.

$c_i$ denotes the maximum number of remaining paid clicks for ad i.

$\Pi_i$ denotes the total minimum number of impressions required by ad i over the duration of its campaign.

$I_i$ denotes the minimum number of remaining impressions required for ad i. $I_i$ is updated frequently, such as every hour on the hour.

$s_i$ denotes the payment per click, per view, per conversion, or per any other reasonable measure of activity or performance, depending on the arrangement for ad i.

$n_{i,j}$ is 2 plus the number of impressions for ad i at site j over the last 30 days or other such reasonable period. If the ad has never been shown at site j then $n_{i,j}$=2. (The present invention adds 2 to avoid problems associated with $n_{i,j}$=0)

$k_{i,j}$ is the number of clicks for ad i at site j over the duration of ad i's ad campaign.

$p_{i,j}$ is the observed clicking probability of ad i at site j. If ad i has never been shown ($n_{i,j}$=2) on site j then $p_{i,j}$=$\mu_j$. Otherwise, $$p_{i,j} = \frac{k_{i,j}}{n_{i,j}} + \mu_j \frac{2}{n_{i,j}}.$$

The second term here is to ensure that the present invention never has $p_{i,j}$=0.

$\delta_i$ controls the smoothness of the campaign. This can depend on the smoothness type, how the campaign is doing in terms of delivery, and other factors. A typical value is 0.2. This controls how smoothly clicks must occur throughout the lifetime of a campaign. A value of 0.2 means that no campaign can ever be more than 20% ahead of absolutely smooth (measured daily) delivery.

Parameters

Set γ=1.5 or any other reasonable number. This is the learning parameter, it controls how heavily the present invention emphasizes learning about ad-site combinations for which the present invention has little information. This will be tuned via simulation.

$\alpha_{i,j}$ denotes the fraction of times ad i should be shown on site j for the next period, such as per hour.

Hourly or Frequent Events

The system sends the number of impressions and the number of clicks for each ad at each site to the ad manager. The ad manager updates $n_{i,j}$, $k_{i,j}$, and $t_i$.

The ad manager calculates $p_{i,j}$.

Updating of $c_i$ and $I_i$

These variables are used in the optimization/scheduling algorithm. First, consider $c_i$. The contract for most ads specifies the beginning and end of the ad campaign and the maximum number of paid clicks. The scheduling algorithm requires a number that is to be used for one day.

In the formula below, the present invention computes the value of $c_i$ that corresponds to a perfectly smooth delivery of clicks from the current time on. Note that in the linear program (LP), the present invention will not require that this be hit exactly, but rather within a pre-set tolerance.

$$c_i = \frac{\max\left(\left(C_i - \sum_{j=1}^{m} k_{i,j}\right), 0\right)}{\max\left((T_i - t_i), \frac{1}{24}\right)}$$

Now, consider $I_i$. Sometimes, it is agreed that ad i must obtain a minimum number of impressions. This minimum number must be satisfied at the end of the campaign. As above, the formula above determines the number of impressions needed during the next day to achieve a smooth delivery of, in this case, impressions.

$$I_i = \frac{\max\left(\left(\Pi_i - \sum_{j=1}^{m} n_{i,j} + 2*m\right), 0\right)}{\max\left((T_i - t_i), \frac{1}{24}\right)}$$

Note that the present invention needs the term 2*m to compensate for the fact the present invention has adjusted $n_{ij}$.

Scheduling problem (solved frequently, such as once every hour on the hour)

Step 1. Define:

$$\hat{p}_{i,j} = p_{i,j} + \gamma \sqrt{\frac{p_{i,j}(1 - p_{i,j})}{n_{i,j} - 1}}$$

Step 2. Solve the following linear programming problem:

$$\underset{\{\alpha_{i,j}\}}{\text{MAX}} \sum_{i \in K} \sum_{j=1}^{m} \alpha_{i,j} v_{i,j} d_j \quad (1)$$

$$\text{Subject to} \sum_{j=1}^{m} \alpha_{i,j} p_{i,j} d_j \le (1 + \delta_i) c_i, \ i \in K \quad (2)$$

$$\sum_{j=1}^{m} \alpha_{i,j} d_j \le (1 + \delta_i) I_i, \ i \in M \quad (3)$$

$$\sum_{i=1}^{n} \alpha_{i,j} \le 1, \ j = 1, 2, \ldots, m \quad (4)$$

$$\alpha_{i,j} \ge 0, \ i = 1, 2, \ldots, n, \ j = 1, 2, \ldots, m \quad (5)$$

where $v_{i,j} = \hat{p}_{i,j} s_i$ if ad i is click-based or conversion-based, and $s_i$ if it is impression-based.

Comments
- (1) The objective function is to maximize the overall value, including learning about sites where we have little information.
- (2) The LHS is the total number of expected clicks for ad i during the interval. This constraint enforces the campaign smoothness condition.
- (3) The LHS is the total number of expected impressions for ad i during the interval. This constraint enforces the campaign smoothness condition.
- (4) This constraint ensures that the probabilities of what ads to show at each site add to 100%.
- (5) This constraint ensures that all probabilities are non-negative.

Remarks
- (1) By setting $s_i=1$ for all i converts the objective function into one that seeks to maximize the overall Click-Thru-Rate (CTR).
- (2) There is no explicit constraint ensuring that each ad does not fall "too far behind". The reason for this is such a constraint would lead to the linear program (LP) having no feasible solution.
- (3) To account for the remark above, campaigns should be monitored on a frequent basis (daily) with poor ads being removed or outsourced.
- (4) Note that there is obviously always a solution to the LP.

Creating an Ad Lookup Table

The present invention describes the process of converting the output of the linear program (LP) into a lookup table. For each site j and ad i multiply the $\alpha_{i,j}$ by 100 and round off the product to the nearest integer. Let $\beta_{i,j}=\text{Round}(100*\alpha_{i,j})$. $\beta_{i,j}$ represents how many times out of a hundred ad i should be shown at site j. Create a list for site j by letting the first $\beta_{1,j}$ elements be ad 1, let the next $\beta_{2,j}$ be ad 2, and so forth. This process will yield a list of approximately 100 ads for each site (many ads will appear several times for a given Web site). The next step is to ensure that the list has exactly 100 ads for each site. This is done by truncating the list for any site with more than 100, and repeating the first ad on the list as many times as necessary for any site with less than 100. It is possible to employ a frequency-capping component at this stage of the algorithm.

Daily Routine

Figure 4:
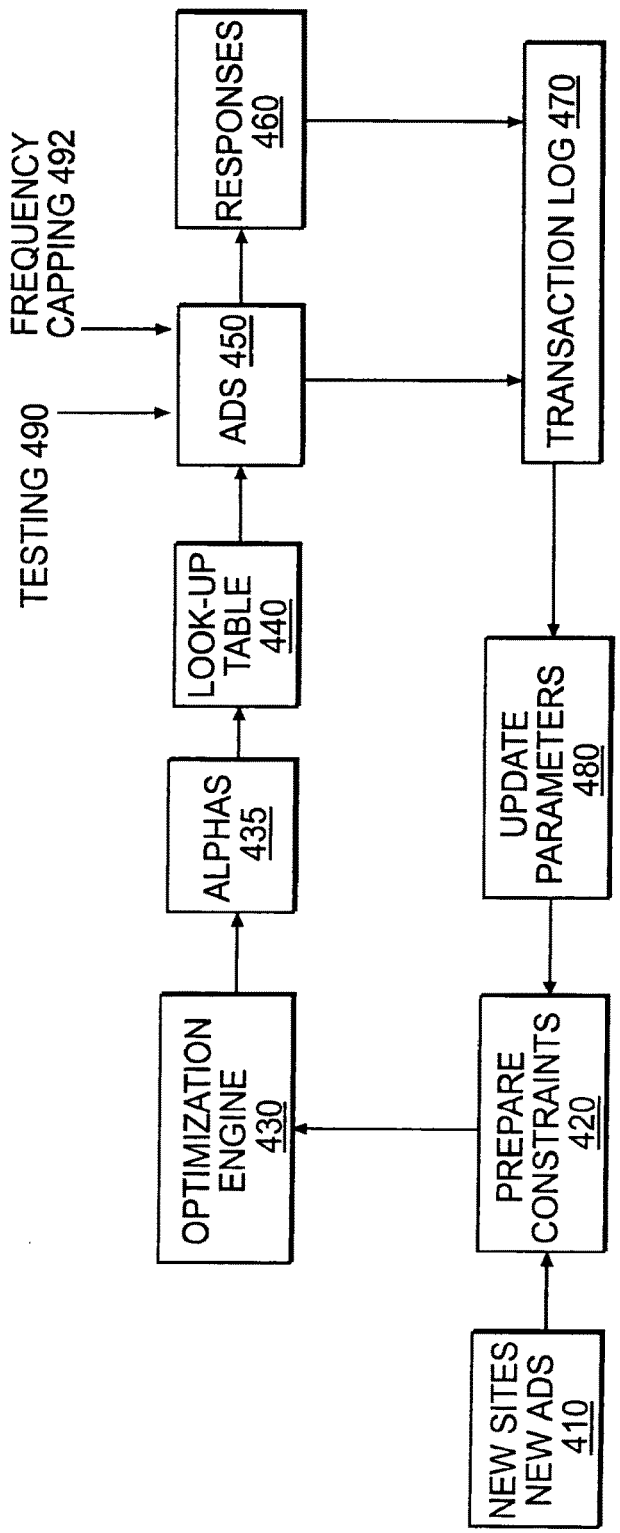
FIG. 4 illustrates a schematic of the present invention.

Calculate $d_j$ and $\mu_j$ over the last 30 days or other such reasonable period, as shown in the schematic diagram of FIG. 4. When new sites or new ads 410 are added, constraints are prepared 420, and the new matrices are added to the ad server's optimization engine 430. Prior to having adequate data, initial estimates (alphas) 435 are used and the data is added to the ad look-up tables 440. The ads are then served at 450 (with testing 490 and frequency capping 492). Response data is collected at 460 and recorded together with the ad serving information in transaction log 470. The data is then used to update parameters at 480, and the iterative process continues.

Enhancements

This framework allows for a number of additional constraints to be added in a natural way.

Click Probability Estimation with Principal Components

Above, the probability that users visiting Web site j will click on ad i was estimated by dividing the number of clicks on ad i at Web site j with the number of impressions of ad i at Web site j, but can be estimated by any other reasonable method.

An alternative is a principal component approach to banner ad probability estimation. This approach contains two steps. In the first step we estimate the principal component vectors whereas in the second step we estimate the banner ads' click probabilities. Each step are updated as new information becomes available. The advantage to using the principal component approach is significant. For example, if there are 100 Web sites and 5 principal components then the conventional approach requires approximately 20 times as many impressions as the principal component approach to reach the same level of accuracy.

This approach is begun by presenting a series of definitions. It continues by describing the principal component estimation, and concludes by finally describing the probability estimation.

Definitions

Probabilities Estimate of the probability that users downloading ad i from Web site j will click on that ad is $p_{i,j}$.
Error Uncertainty of the estimate $p_{i,j}$ is $\sigma_{i,j}=p_{i,j}*(1-p_{i,j})/n$, (a slightly biased estimate),
Sites There are m sites.
Site Average Let $\mu_j$ denote the average click probability on site j.
Normalized Ad Probability Vector—For each ad i we define the vector $y_i=[y_{i,1}, y_{i,2}, \ldots, y_{i,m}]$ where $$y_{i,j} = \frac{(p_{i,j}-1)}{\sigma_{i,j}}.$$

Principal Components—hypothesize that there exist l m-dimensional vectors $x_1, x_2, \ldots, x_l$, such that every ad probability vector is a linear combination of $x_1, x_2, \ldots, x_l$.
Other Let $n_{i,j}$ denote the number of impressions of ad i on Web site j and let $k_{i,j}$ denote the number of clicks of ad i on Web site j.

Principal Components Estimation

When using principal components estimation, the present invention identifies ads that have been shown a large number of times at many Web sites. These are the ads that will be used to calculate the principal components.

Step 1. Calculate estimation of site averages.

$$\mu_j = \frac{\sum_i p_{i,j}}{\text{Count }(i \text{ on } j)}$$

Step 2. Calculate the variance of the error of each probability estimate.

$$\sigma_{i,j}=p_{i,j}*(1-p_{i,j})/n$$

Step 3. Calculate normalized ad probability vectors.
Step 4. Calculate the principal components by first creating the matrix Y. Row i of Y corresponds to ad i. Then calculate the matrix product $Y^TY$. Then find the eigenvectors and eigenvalues of $Y^TY$. Choose the k eigenvectors corresponding to the k eigenvalues which together accounts for at least x % of the total of the sum of all eigenvalues. The first principal component corresponds to the first eigenvector as follows: Element i of the eigenvector is the weight associated with ad i. Therefore, multiply the elements of the first eigenvector with their corresponding estimated probabilities for each site and sum over these newly found values to determine the first principal component vector. Repeat the procedure for the remaining k-1 eigenvectors.

Banner Ad Click Probability Estimation

With the principal components available there are a variety of ways to estimate an ad's click probabilities. Two straightforward methods of such estimation are ordinary least squares regression and generalized least squares regression.

The objective of the principal component approach is to efficiently and quickly obtain ad probabilities for a majority of banners. In addition to finding the probabilities for the majority it is also necessary to identify banners where the principal components do not capture a significant portion of the observed probabilities. A maximum likelihood approach can be used to integrate this aspect into the probability estimation routine.

Binomial Updating of Click Probabilities Using Principal Components

Consider a row of n cells that have unknown click probabilities $p_i$, where cells are i=1, 2, . . . , n Assume there is a single (for notational simplicity) principal component that is likely to give these probabilities. This principal component is a vector $v=(v_1, v_2, \ldots, v_n) \geq 0$. Then model the vector P as $$P = av + e$$

where a is an unknown constant and $e=(e_1, e_2, \ldots, e_n)$ is a vector of errors.

Then assume that the $e_i$'s are independent, normal random variables with zero mean and variance $\sigma^2$. The variance is determined by the process that determines the principal components.

Now, imagine the system has been run for a while and has observed $k_i$ from $n_i$ in cell i. It is then desirable to assign the best $p_i$'s.

The joint probability of those click rates and the probabilities given a is $$P = \prod_{i=1}^{n} \exp\left[\frac{-1}{2\sigma^2}(p_i - av_i)^2\right] \prod_{i=1}^{n} p_i^{k_i}(1-p_i)^{n_i-k_i} C$$

where C is a constant independent of a and the $p_i$'s.

Now determine a and the $p_i$'s by maximizing P with respect to a and the $p_i$'s. Ignoring C, to obtain:

$$\ln P = \frac{-1}{2\sigma^2}\sum_{i=1}^{n}(p_i - av_i)^2 + \sum_{i=1}^{n}[k_i \ln p_i + (n_i - k_i)\ln(1-p_i)] \quad (*)$$

Note that ln P is concave with respect to a and $p_i$'s$\geq 0$, so maximization is well-defined. Note that (as one would expect) if $\sigma \gg 0$ and/or $n_i$, $k_i$ large, one find $$p_i = \frac{k_i}{n_i}.$$

Also, for $\sigma$ small and/or $n_i$, $k_i$ small, one finds $p_i = av_i$.

Now, the problem is separable with respect to $p_i$'s, so one strategy is to maximize with respect to $p_i$ with a fixed. This gives the necessary condition:

$$F(p_i) = \frac{-1}{\sigma^2}(p_i - av_i) + \frac{k_i}{p_i} - \frac{(n_i - k_i)}{(1-p_i)^2} = 0$$

Note that $F(0)=+\infty$ and that $F(1)=\infty$. Hence, there is a $p_i$ with $0 < p_i < 1$ and $F(p_i) = 0$.

Furthermore, $$F'(p_i) = \frac{-1}{\sigma^2} - \frac{k_i}{p_i^2} - \frac{(n_i - k_i)}{(1-p_i)^2} < 0$$

so F is monotone. Thus, the solution is unique.

It can therefore be concluded that for a given a, there is for each i=1, 2, . . . , n a unique $p_i$, $0 < p_i < 1$, that can be easily found by Newton's method or any other descent method. (The case of $k_i = 0$ is handled separately later.)

Now, consider $p_i$ to be a function of a. Then, $$\frac{\partial}{\partial a}\ln P = \frac{\partial \ln P}{\partial a} + \sum_{i=1}^{n}\frac{\partial \ln P}{\partial p_i}P'_0$$

$$= \frac{\partial \ln P}{\partial a}$$

$$= \frac{1}{\sigma^2}\sum_{i=1}^{n}(p_i^{(a)} - av_i)v_i$$

This discussion motivates the following algorithm:
1. Select initial a
2. Find the $p_i$'s by solving $F_i(p_i,a)=0$ (Newton's method 1 variable at a time)
3. Evaluate $$\frac{\partial}{\partial a}$$

ln P
4. Adjust a by steepest descent

Note that the extension to multiple principal components is straightforward.

Case of $k_i = 0$

The necessary condition is $$(1-p_i)(av_i-p_i)=n_i\sigma^2$$

It is easy to see that if $av_i > n_i\sigma^2$, then there is a solution with $0 < p_i < 1$. Otherwise $p_i = 0$. should be used. Putting this together, $p_i = \max\{\text{root}_1, 0\}$ where $\text{root}_1$ is the root of the quadratic less than 1. That is, $$\text{root}_1 = \frac{1 + av_i - \sqrt{(1+av_i)^2 - 4(av_i - n_i\sigma^2)}}{2}$$

Note that it follows from this that if $n_i = 0$, we have $p_i = av_i$. If $k_i = 0$ repeatedly, one does not set $p_i = 0$ until they get at least $$n_i = \frac{av_i}{\sigma^2}$$

impressions.

Initial Value of a

If all the $n_i$'s are small, and/or $\sigma^2$ is small, we set $p_i = av_i$ for all i.

Then, $$\mathrm{Ln} P = \sum_{i=1}^{n} k_i \ln a v_i + \sum_{i=1}^{n} (n_i - k_i) \ln(1 - a v_i)$$

$$\frac{\partial \ln P}{\partial a} = \sum_{i=1}^{n} \frac{k_i}{a} - \sum_{i=1}^{n} \frac{(n_i - k_i)}{1 - a v_i} v_i = 0$$

Solve for a.
This can be interpreted by multiplying by a.

$$\sum_{i=1}^{n} k_i = \sum_{i=1}^{n} (n_i - k_i) \frac{a v_i}{1 - a v_i}$$

which shows that a is set to balance the overall probabilities consistent with observed clicks and impressions.

Prior Distribution on a

Adding a prior density on a as $$\frac{1}{\sqrt{2\pi} \, \omega} \exp\left\{ -\frac{1}{2\omega^2} (a - a_0)^2 \right\}$$

This adds the term $$-\frac{1}{2\omega^2} (a - a_0)^2$$

to ln P as defined in (*) above.

Category Restrictions

Certain advertisers would like to have their ads displayed only on a subset of the sites. This is handled in the following way. Let the subset of such sites be denoted by J. This might be, for example, the set of all sports related sites. Then, if the present invention is considering ad i, the restriction takes the form:

$\alpha_{i,j} = 0$ for all $j \notin J$.

The subset J can, of course, involve multiple levels of categories, generally chosen by the advertiser. A typical subset could be something like 'all of the sports related—Spanish language—G-rated sites.'

Ad Blocking

Conversely, certain Web sites would like to prevent particular ads from appearing on their site. This may be the case, for instance, if the item being advertised is viewed as a competitor to the Web site's product. Let the site be denoted by j and the set of ads to be blocked to be denoted by the set I. Then the restriction has the form $\alpha_{i,j} = 0$ for all $i \in I$.

Typically, a Web site would be able to do this by both blocking entire categories, such as R-rated sites, and by selecting particular ads for exclusion, such as one of a direct competitor.

Click-Thru-Rate (CTR) of Impression Based Ads

Even with contracts that are strictly impression based, it may be advantageous to attempt to enhance the CTR of such ads. Providing a good CTR may lead to more future business. To do this, the present invention must determine how valuable each click on an impression based ad is in economic terms. Then, this can simply be added to the objective function.

Clustering Process

Automatic clustering of small Web sites can be employed in a manner that effectively improves overall Click-Thru-Rates. To form clusters, the process starts by matching each ad with a campaign type, which is assigned through a GUI. There are types for 'Personal Finance', 'Sports', 'Computers and Technology', and the like. The present invention denotes each campaign type $t_i$, i=1, 2, . . . , 20, and the set of all campaign types T. Each cluster will correspond to one of these types.

To determine which types will be used for clustering, a database is used with the history of the last 30 days or other reasonable period, and count all the impressions for each type. If the objective is to form n clusters, then the first n types ordered by descending number of impressions are selected to be the clustering types. Now call each clustering type $\hat{t}_j$, j=1, 2, . . . , n, and the set of all the clustering types $\hat{T}$. Each clustering type is assigned a number (ID) starting from 2 and going up until n+1. A Webmaster with cluster ID=0 means that it was not clustered, and with ID=1 means it is in a cluster of special Webmasters.

The database contains information on all the campaign types that each Webmaster showed. Not all webmasters-type pairs in the database will be used to perform the computations; in one embodiment, only those that meet the following requirements:

It must have more than 2 impressions on a type
It must have more than 1 click on a type
The CTR for a type must be less than 100%

Although this is a preferred screening process, any other such reasonable screening process can be used without departing from the scope of the present invention.

In addition, the set of campaign types for a Webmaster must be a superset of the clustering types: $\hat{T} \subseteq T_m$, where m represents a particular Webmaster.

Each Webmaster will be assigned to one and only one cluster, so it will have a corresponding cluster ID, $ID_m$. Only one more piece of information is needed to determine the cluster ID of each Webmaster: p-hat.

$$\text{p\_hat}_{m,\hat{t}_i} = CTR_{m,i} + \gamma \sqrt{\frac{CTR_{m,i}(1 - CTR_{m,i})}{imps_{m,i}}},$$

where γ is a learning parameter m is the Webmaster, i is the campaign type, and $imps_{m,i}$ refers to the number of impressions for the Webmaster-campaign type pair. Now, $$ID_m = 1 + \underset{j}{\mathrm{argmax}} \left( \text{p\_hat}_{m,\hat{t}_j} \right), j = 1, 2, \ldots, n.$$

Each j corresponds to a clustering type, as defined before.

Thus, the object is to look for the max p-hat for each Webmaster. The type associated with the max p-hat will be cluster assigned to the Webmaster. In order to write the output, the present invention translates the type to its cluster ID.

Splitting Large Clusters

It could be the case that once clusters are formed, the total number of impressions for one of them will be over 20% or any other reasonable set percentage of the total number of impressions for all the clusters. In this case, it is desirable to split the cluster by applying the clustering process to those Webmasters in the largest cluster, and by forming a new set of two clustering types for them that excluded the type associated with the cluster. For instance, if cluster 3 with associated type 'Sports' is the target, then a new clustering type set might be {'Entertainment', 'Health'}, which will be chosen because they are the two types with the most and second-most impressions. Each Webmaster will be assigned a new cluster ID using the same "max p-hat" criteria.

The splitting process is repeated until no cluster has more than 20% of all the impressions.

Integrated Channel Management

Figure 5:
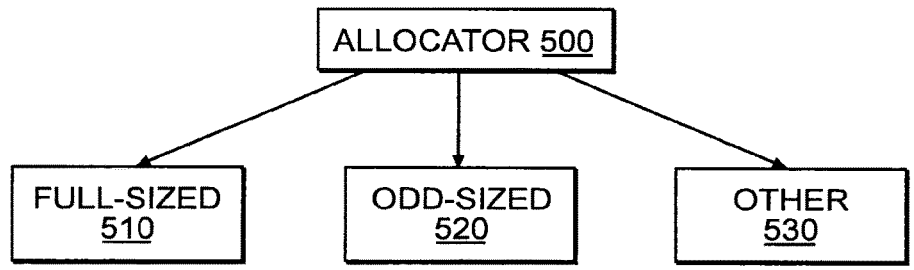
FIG. 5 illustrates the Integrated Channel Management system of the present invention.

It is also desirable to optimize ad placement across a diverse set of media, such as banners, e-mail, and wireless, in an integrated manner. An allocator 500, as shown in FIG. 5, can be used to serve full-sized 510, odd-sized 520, and other type 530 ads using the following algorithm:

Definitions $V_i$=Expected impressions per period, such as per day, of media type i.
$p_{ij}$=probability of a click on media type i for campaign j.
$G_j$=Total target number of clicks for campaign j for the period.
$\zeta_{ij}$=The percent of all impressions from media i that will be allocated to campaign j.

$$\text{Max} \sum_{i,j} p_{ij} \zeta_{ij} V_i$$

$$\text{s.t.} \sum_j \zeta_{ij} \leq 1 \text{ for all } i$$

$$\sum_i p_{ij} \zeta_{ij} V_i \leq (1+\delta) G_j \text{ for all } j$$

$$\zeta_{ij} \geq 0 \text{ for all } i \text{ and } j$$

Of course, constraints enforcing minimum and maximum representation on various channels are possible as well.

Then, $p_{ij}\zeta_{ij}V_i$ is sent to the LP as the upper bound for campaign j for channel type i.

Multiple Ads from One Customer

From time to time, an advertiser will employ multiple banner designs. One approach to this, of course, is simply to treat each of these as a separate ad. However, if the advertiser is willing to let the optimizer select which ads to show, the present invention can expect on average an improvement in the CTR. Imagine that the two ads are labeled l and m, and that the initial click totals (on an average daily basis) were $c_l$ and $c_m$. Then, normally the present invention would have included the two constraints:

$$\sum_{j=1}^{m} \alpha_{l,j} p_{l,j} d_j \leq (1+\delta) c_l$$

$$\sum_{j=1}^{m} \alpha_{m,j} p_{m,j} d_j \leq (1+\delta) c_m$$

Instead, the present invention can replace this with the single constraint, which is less restrictive and therefore will result in a better or equal solution:

$$\sum_{j=1}^{m} (\alpha_{l,j} p_{l,j} d_j + \alpha_{m,j} p_{m,j} d_j) \leq (1+\delta)(c_l + c_m)$$

It is also possible to do something in between the above two solutions. For example, an advertiser with two different ad designs could ask for a total of 10,000 clicks with a minimum of 2,500 each. Therefore, there are many other reasonable solutions.

Figure 6:
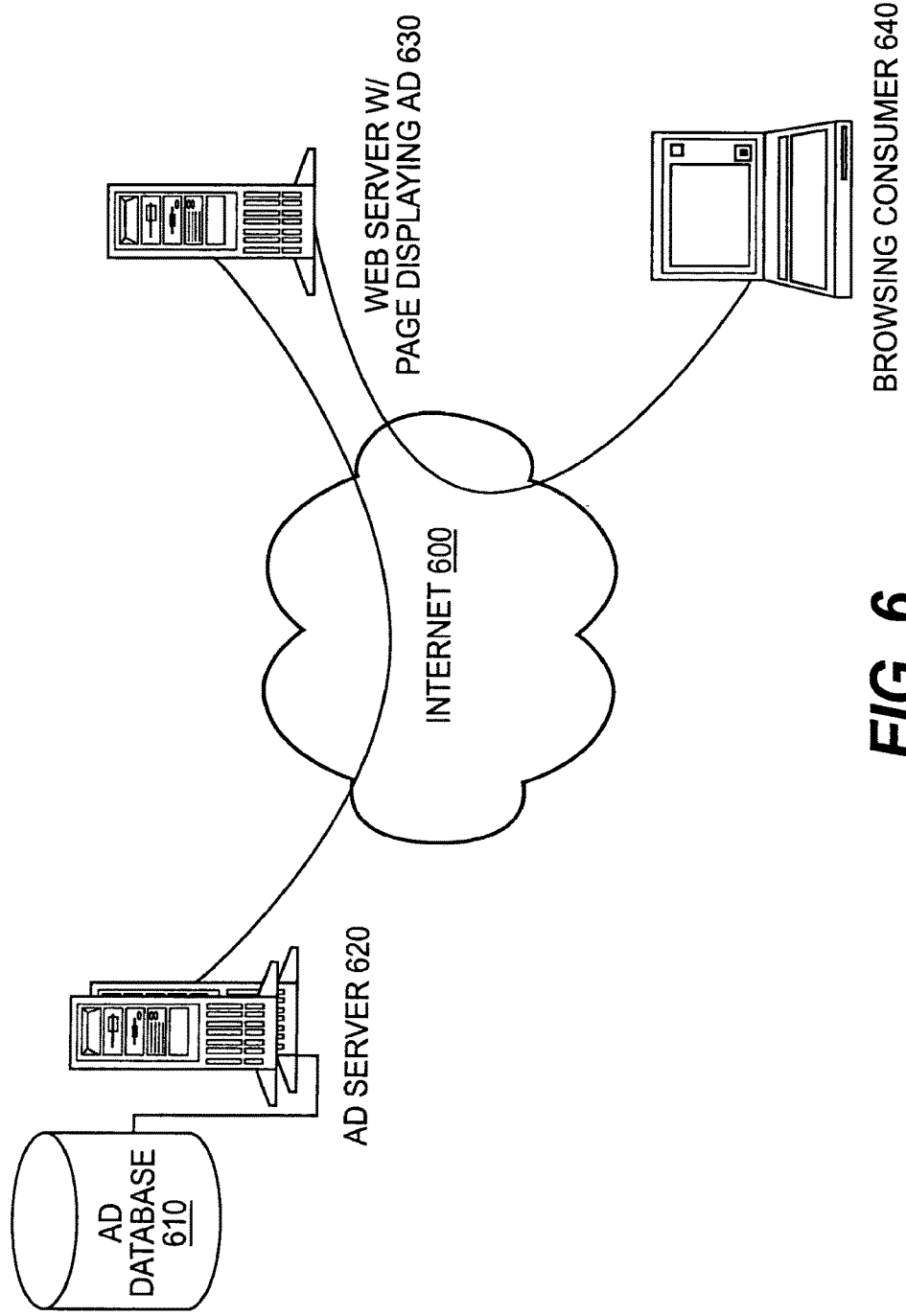
FIG. 6 illustrates a schematic of the system of the present invention.

The method of the present invention can be practiced by conventional servers 620, 630, such as Pentium III based systems operating with Windows NT, interacting over the Internet 600 to collect attribute information about customers 640 and ads from database 610, and then serve the ads to the customers 640 operating Internet enabled devices with browsers, such as Apple Macintosh or Windows-based personal computers with browser clients like Internet Explorer or Netscape Navigator, as shown in FIG. 6. As such, there are no special requirements for the user interaction on the Internet using the present invention. Conventional PCs, which may be Pentium based or Apple Macintosh type processors, are all suitable processors for exercising the present invention. Likewise, the server of the present invention can be an Intel Pentium type server, Sun server or other server suitable for serving advertisements.

Numerous aspects of the present invention also have separate utility outside of any Internet enabled distribution channels. The basic modeling methodologies and algorithms of the present invention are therefore able to be incorporated with virtually any other marketing medium in which an "ad" is displayed to a "customer," including, but not limited to, mail, telephone, facsimile, television, radio, and print media. Other embodiments, with modifications and changes to the preferred embodiment, will be apparent to those skilled in the art without departing from the scope of the present invention as disclosed. Therefore, the present invention is only limited by the claims appended hereto.

The invention claimed is:

1. A method comprising:
  receiving, by at least one server, one or more advertisements associated with a campaign, the campaign having an associated number of impressions or clicks;
  determining, by the at least one server, a first probability that the one or more advertisements will be selected by a plurality of users sharing a demographic when the one or more advertisements are served to client devices associated with the plurality of users via a first network-based media type;
  determining, by the at least one server, a second probability that the one or more advertisements will be selected by the plurality of users sharing the demographic when the one or more advertisements are served to the client devices associated with the plurality of users via a second network-based media type, wherein the first network-based media type and the second network-based media type comprise a diverse set of network-based media types;
  allocating, by at least one server, a number of impressions or clicks of the associated number of impressions or clicks of the one or more advertisements for serving to client devices associated with the plurality of users via each of the first network-based media type and the second network-based media type as a function of the first probability and the second probability as follows:

Max $\Sigma_{i,j} p_{ij} \zeta_{ij} V_i$, wherein:

$\Sigma_j \zeta_{ij} \leq 1$ for all i;

$\Sigma_i p_{ij} \zeta_{ij} V_i \leq (1+\delta) G_j$ for all j, where δ controls the smoothness of the campaign;

$\zeta_{ij} \geq 0$ for all i and j, and wherein:

$V_i$ is the expected impressions per period of media type i;

$p_{ij}$ is the probability of a click on media type i for campaign j;

$G_j$ is the total target number of clicks for campaign j for the period;

$\zeta_{ij}$ is the percent of all impressions from media type i allocated to campaign j; and wherein allocating the number of impressions or clicks optimizes placement of the one or more advertisements across the diverse set of network-based media types based on the first probability and the second probability; and serving, by at least one server and over a network, the one or more advertisements to the client devices associated with the plurality of users via both the first network-based media type and the second network-based media type according to the allocated number of impressions or clicks for each of the first network-based media type and the second network-based media type.

2. The method as recited in claim 1, further comprising allocating a minimum number of impressions or clicks to serve to the client devices associated with the plurality of users via each of the first network-based media type and the second network-based media type.

3. The method as recited in claim 2, further comprising allocating a maximum pre-set tolerance number of impressions or clicks to serve to the client devices associated with the plurality of users via each of the first network-based media type and the second network-based media type.

4. The method as recited in claim 1, further comprising allocating the number of impressions or clicks to serve to the client devices associated with the plurality of users via each of the first network-based media type and the second network-based media type as a function of an expected number of impressions or clicks during a period of time for each of the first network-based media type and the second network-based media type.

5. The method as recited in claim 4, further comprising allocating the number of impressions clicks to serve to the client devices associated with the plurality of users via each of the first network-based media type and the second network-based media type as a function of a target number of impressions or clicks for the campaign.

6. The method as recited in claim 5, further comprising allocating the number of impressions or clicks to serve to the client devices associated with the plurality of users via each of the first network-based media type and the second network-based media type as a function of a percent of all impressions or clicks from each of the first network-based media type and the second network-based media type to be allocated to the campaign.

7. The method as recited in claim 1, wherein the first probability and the second probability are each a function of observed click-thru-rates; and the method further comprising adjusting the first probability for an advertisement based on an uncertainty level of the observed click-thru-rates, wherein the uncertainty level is inversely proportional to a number of times the advertisement has been previously served.

8. The method as recited in claim 1, further comprising:

determining a third probability that the one or more advertisements will be selected when served via a third network-based media type;

allocating another number of impressions or clicks of the associated number of impressions or clicks to serve to the client devices associated with the plurality of users via the third network-based media type as a function of the third probability; and serving the one or more advertisements to the client devices associated with the plurality of users via the third network-based media type according to the another allocated number of impressions or clicks.

9. The method as recited in claim 1, wherein:

the first network-based media type comprises websites; and the second network-based media type comprises mobile devices.

10. A non-transitory computer-readable storage medium including a set of instructions that, when executed, cause at least one processor to perform steps comprising:

receiving one or more advertisements associated with a campaign, the campaign having an associated number of impressions or clicks;

determining a first probability that the one or more advertisements will be selected by a plurality of users sharing a demographic when the one or more advertisements are served to client devices associated with the plurality of users via a first network-based media type;

determining a second probability that the one or more advertisements will be selected by the plurality of users sharing the demographic when the one or more advertisements are served to the client devices associated with the plurality of users via a second network-based media type, wherein the first network-based media type and the second network-based media comprise a diverse set of network-based media types;

allocating a number of impressions or clicks of the associated number of impressions or clicks of the one or more advertisements for serving to the client devices associated with the plurality of users via each of the first network-based media type and the second network-based media type as a function of the first probability and the second probability as follows:

Max $\Sigma_{i,j} p_{ij} \zeta_{ij} V_i$, wherein:

$\Sigma_j \zeta_{ij} \leq 1$ for all i;

$\Sigma_i p_{ij} \zeta_{ij} V_i \leq (1+\delta) G_j$ for all j, where δ controls the smoothness of the campaign;

$\zeta_{ij} \geq 0$ for all i and j, and wherein:

$V_i$ is the expected impressions per period of media type i;

$p_{ij}$ is the probability of a click on media type i for campaign j;

$G_j$ is the total target number of clicks for campaign j for the period;

$\zeta_{ij}$ is the percent of all impressions from media type i allocated to campaign j; and wherein allocating the number of impressions or clicks optimizes placement of the one or more advertisements across the diverse set of network-based media types based on the first probability and the second probability; and serving the one or more advertisements to the client devices associated with the plurality of users via both the first network-based media type and the second network-based media type according to the allocated number of impressions or clicks for each of the first network-based media type and the second network-based media type.

11. The computer-readable storage medium as recited in claim 10, further comprising instructions that, when executed, cause at least one processor to allocate a minimum number of impressions or clicks to serve to the client devices associated with the plurality of users via each of the first network-based media type and the second network-based media type.

12. The computer-readable storage medium as recited in claim 11, further comprising instructions that, when executed, cause at least one processor to allocate a maximum pre-set tolerance number of impressions or clicks to serve to the client devices associated with the plurality of users via each of the first network-based media type and the second network-based media type.

13. The computer-readable storage medium as recited in claim 10, further comprising instructions that, when executed, cause at least one processor to allocate the number of impressions or clicks to serve to the client devices associated with the plurality of users via each of the first network-based media type and the second network-based media type as a function of an expected number of impressions or clicks during a period of time for each of the first network-based media type and the second network-based media type.

14. The computer-readable storage medium as recited in claim 13, further comprising instructions that, when executed, cause at least one processor to allocate the number of impressions or clicks to serve to the client devices associated with the plurality of users via each of the first network-based media type and the second network-based media type as a function of a percent of all impressions or clicks from each of the first network-based media type and the second network-based media type to be allocated to the campaign.

15. The computer-readable storage medium as recited in claim 14, further comprising instructions that, when executed, cause at least one processor to allocate the number of impressions or clicks to serve to the client devices associated with the plurality of users via each of the first network-based media type and the second network-based media type as a function of an expected number of impressions or clicks during a period of time for each of the first network-based media type and the second network-based media type.

16. The computer-readable storage medium as recited in claim 10, wherein the first probability and the second probability are each a function of observed click-thru-rates; and
further comprising instructions that, when executed, cause at least one processor to adjust the first probability for an advertisement based on an uncertainty level of the observed click-thru-rates, wherein the uncertainty level is inversely proportional to a number of times the advertisement has been previously served.

17. The computer-readable storage medium as recited in claim 10, further comprising instructions that, when executed, cause at least one processor to:
determine a third probability that the one or more advertisements will be selected when served via a third network-based media type; and
allocate a number of impressions or clicks of the associated number of impressions or clicks to serve to the client devices associated with the plurality of users via the third network-based media type as a function of the third probability.

18. The computer-readable storage medium as recited in claim 10, wherein:
the first network-based media type comprises websites; and
the second network-based media type comprises mobile devices.

19. A method comprising:
receiving, by at least one server, one or more advertisements associated with a campaign, the campaign having an associated number of impressions or clicks and an associated minimum number of impressions or clicks for serving the one or more advertisements associated with the campaign to serve to client devices associated with a plurality of users via one of a first network-based media type or a second network-based media type of a plurality of diverse network-based marketing media types;
determining, by at least one server, a first expected number of impressions or clicks by the plurality of users for a first time period for the one or more advertisements associated with the campaign served via the first network-based media type;
determining, by at least one server, a second expected number of impressions or clicks by the plurality of users for the first time period for the one or more advertisements associated with the campaign served via the second network-based media type;
allocating, by the at least one server, a number of impressions or clicks of the associated number of impressions or clicks of the one or more advertisements for serving to the client devices associated with the plurality of users during the first time period via each of the first network-based media type and the second network-based media type as a function of the first expected number of impressions or clicks for the first network-based media type, the second expected number of impressions or clicks for the second network-based media type, and the minimum number of impressions or clicks as follows:
Max $\Sigma_{i,j} p_{ij} \zeta_{ij} V_i$, wherein:
$\Sigma_j \zeta_{ij} \leq 1$ for all i;
$\Sigma_i p_{ij} \zeta_{ij} V_i \leq (1+\delta) G_j$ for all j, where $\delta$ controls the smoothness of the campaign;
$\zeta_{ij} \geq 0$ for all i and j, and wherein:
$V_i$ is the expected impressions per period of media type i;
$p_{ij}$ is the probability of a click on media type i for campaign j;
$G_j$ is the total target number of clicks for campaign j for the period;
$\zeta_{ij}$ is the percent of all impressions from media type i allocated to campaign j; and
wherein allocating the number of impressions or clicks optimizes placement of the one or more advertisements across the diverse set of network-based media types based on the first probability and the second probability; and
serving, by at least one server, the one or more advertisements to the client devices associated with the plurality of users via both the first network-based media type and the second network-based media type according to the allocated number of impressions or clicks for each of the first network-based media type and the second network-based media type.

20. The method as recited in claim 19, wherein the plurality of diverse network-based marketing media types includes one or more of websites, mobile devices, computer software, email, smart devices, and interactive television.

21. The method as recited in claim 20, further comprising determining a first probability that the one or more advertisements will be selected when served via the first network-based media type;
   determining a second probability that the one or more advertisements will be selected wherein served via the second network-based media type; and
   wherein the allocating the number of impressions or clicks of the associated number of impressions or clicks for serving to the client devices associated with the plurality of users via each of the first network-based media type and the second network-based media type is further a function of the first probability and the second probability.

22. The method as recited in claim 21, further comprising:
   determining a third probability that the one or more advertisements will be selected when served via a third network-based media type; and
   allocating another number of impressions or clicks of the associated number of impressions or clicks to serve to the client devices associated with the plurality of users via the third network-based media type as a function of the third probability; and
   serving the one or more advertisements to the client devices associated with the plurality of users via the third network-based media type according to the another allocated number of impressions or clicks.

23. The method as recited in claim 22, wherein the third network-based media type comprises the other of mobile devices and emails.

24. A non-transitory computer-readable storage medium including a set of instructions that, when executed, cause at least one processor to perform steps comprising:
   receiving one or more advertisements associated with a campaign, the campaign having an associated number of impressions or clicks and an associated minimum number of impressions or clicks for serving the one or more advertisements associated with the campaign to serve to client devices associated with a plurality of users via one of a first network-based media type or a second network-based media type, wherein the first network-based media type and the second network-based media type comprise a diverse set of network-based media types;
   determining a first expected number of impressions or clicks by the client devices associated with the plurality of users for a first time period for the one or more advertisements associated with the campaign served via the first network-based media type;
   determining a second expected number of impressions or clicks by the client devices associated with the for the first time period for the one or more advertisements associated with the campaign served via the second network-based media type;
   allocating a number of impressions or clicks of the associated number of impressions or clicks of the one or more advertisements for serving to the client devices associated with the plurality of users during the first time period via each of the first network-based media type and the second network-based media type as a function of the first expected number of impressions or clicks for the first network-based media type, the second expected number of impressions or clicks for the second network-based media type, and the minimum number of impressions or clicks as follows:
   Max $\Sigma_{i,j} p_{ij} \zeta_{ij} V_i$, wherein:
   $\Sigma_j \zeta_{ij} \leq 1$ for all i;
   $\Sigma_i p_{ij} \zeta_{ij} V_i \leq (1+\delta) G_j$ for all j, where $\delta$ controls the smoothness of the campaign;
   $\zeta_{ij} \geq 0$ for all i and j, and wherein:
       $V_i$ is the expected impressions per period of media type i;
       $p_{ij}$ is the probability of a click on media type i for campaign j;
       $G_j$ is the total target number of clicks for campaign j for the period;
       $\zeta_{ij}$ is the percent of all impressions from media type i allocated to campaign j; and
       wherein allocating the number of impressions or clicks optimizes placement of the one or more advertisements across the diverse set of network-based media types based on the first probability and the second probability; and
   serving the one or more advertisements to the client devices associated with the plurality of users via both the first network-based media type and the second network-based media type according to the allocated number of impressions or clicks for each of the first network-based media type and the second network-based media type.

25. The computer-readable storage medium as recited in claim 24, wherein the first network-based media type comprises websites and the second network-based media type comprises one of mobile devices or emails.

26. The computer-readable storage medium as recited in claim 25, further comprising instructions that, when executed, cause at least one processor to:
   determine a first probability that the one or more advertisements will be selected when served via the first network-based media type;
   determine a second probability that the one or more advertisements will be selected wherein served via the second network-based media type; and
   wherein the instructions, that, when executed, further cause at least one processor to allocate the number of impressions or clicks of the associated number of impressions or clicks to serve to the client devices associated with the plurality of users via each of the first network-based media type and the second network-based media type as a function of the first probability and the second probability.

27. The computer-readable storage medium as recited in claim 26, further comprising instructions that, when executed, cause at least one processor to:
   determine a third probability that the one or more advertisements will be selected when served via a third network-based media type; and
   allocate another number of impressions or clicks of the associated number of impressions or clicks to serve to the client devices associated with the plurality of users via the third network-based media type as a function of the third probability; and
   serve the one or more advertisements to the client devices associated with the plurality of users via the third network-based media type according to the another allocated number of impressions or clicks.

28. The computer-readable storage medium as recited in claim 27, wherein the third network-based media type comprises the other of mobile devices and emails.

29. A method comprising:
determining, by at least one processor, a probability selection score that an advertisement will be selected by a plurality of users sharing a demographic when the advertisement is presented to client devices associated with the plurality of users on each of a plurality of diverse network-based marketing media types;
identifying a network-based marketing media type of the plurality of diverse network-based marketing media types having a high probability selection score;
allocating the plurality of diverse network-based marketing media types for the client devices associated with the based on:
Max $\Sigma_{i,j} p_{ij} \zeta_{ij} V_i$, wherein:
$\Sigma_j \zeta_{ij} \leq 1$ for all i;
$\Sigma_i p_{ij} \zeta_{ij} V_i \leq (1+\delta) G_j$ for all j, where $\delta$ controls the smoothness of the campaign;
$\zeta_{ij} \geq 0$ for all i and j, and wherein:
- $V_i$ is the expected impressions per period of media type i;
- $p_{ij}$ is the probability of a click on media type i for campaign j;
- $G_j$ is the total target number of clicks for campaign j for the period;
- $\zeta_{ij}$ is the percent of all impressions from media type i allocated to campaign j; and
wherein allocating the number of impressions or clicks optimizes placement of the one or more advertisements across the diverse set of network-based media types based on the first probability and the second probability; and
serving the advertisement to the client devices associated with the plurality of users sharing the demographic via the identified network-based marketing media type according to the allocation of the plurality of diverse network-based marketing media types.

30. The method as recited in claim 29, wherein identifying the network-based marking media type of the plurality of diverse network-based marketing media types having the high probability selection score comprises identifying the network-based marking media type of the plurality of diverse network-based marketing media types having a highest probability selection score.

31. The method as recited in claim 29, wherein the probability selection score is a function of observed click-thru-rates by the client devices associated with the plurality of users sharing the demographic.

32. The method as recited in claim 29, further comprising maintaining a user profile, the user profile including user attributes reflecting interests of the client devices associated with the plurality of users sharing the demographic.

33. The method as recited in claim 32, further comprising updating the user attributes of the user profile based on actions of the client devices associated with the plurality of users sharing the demographic on one or more marketing media of the plurality of diverse network-based marketing media types.

34. The method as recited in claim 33, further comprising maintaining an advertisement profile for the advertisement that reflects how much the advertisement correlates to a given user attribute.

35. The method as recited in claim 34, wherein the probability of selection is a function of attributes of the plurality of users sharing the demographic and the advertisement profile.

36. The method as recited in claim 29, wherein the plurality of diverse network-based marketing media types includes one or more of websites, mobile devices, computer software, email, smart devices, and interactive television.

\* \* \* \* \*